United States Patent
Yamaoka

(10) Patent No.: US 10,228,459 B2
(45) Date of Patent: Mar. 12, 2019

(54) RADAR SYSTEM AND RADAR SIGNAL PROCESSING DEVICE

(71) Applicant: MITSUBISHI ELECTRIC CORPORATION, Tokyo (JP)

(72) Inventor: Tomoya Yamaoka, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 457 days.

(21) Appl. No.: 14/906,302

(22) PCT Filed: Oct. 23, 2014

(86) PCT No.: PCT/JP2014/078210
§ 371 (c)(1),
(2) Date: Jan. 20, 2016

(87) PCT Pub. No.: WO2015/064467
PCT Pub. Date: May 7, 2015

(65) Prior Publication Data
US 2016/0170018 A1    Jun. 16, 2016

(30) Foreign Application Priority Data
Oct. 30, 2013    (JP) .................................. 2013-225208

(51) Int. Cl.
*G01S 13/90*    (2006.01)

(52) U.S. Cl.
CPC ........... *G01S 13/90* (2013.01); *G01S 13/9011* (2013.01); *G01S 13/9017* (2013.01)

(58) Field of Classification Search
CPC ... G01S 13/90; G01S 13/9011; G01S 13/9017
USPC .......................................................... 342/25
See application file for complete search history.

(56) References Cited

U.S. PATENT DOCUMENTS

| 4,563,686 A | 1/1986 | Boles |
| 2008/0204311 A1 | 8/2008 | Fujimura |

FOREIGN PATENT DOCUMENTS

| JP | 59-027280 A | 2/1984 |
| JP | 11-183607 A | 7/1999 |
| JP | 2008-203228 A | 9/2008 |

OTHER PUBLICATIONS

An Office Action issued by the Canadian Patent Office dated Jan. 30, 2017, which corresponds to Canadian Patent Application No. 2,916,451 and is related to U.S. Appl. No. 14/906,302.
Chen, V.C., "Time-Frequency Transforms for Radar Imaging and Signal Analysis", Artech House Radar Library, Jan. 2002, ISBN-10:1580532888.
(Continued)

*Primary Examiner* — Frank J McGue
(74) *Attorney, Agent, or Firm* — Studebaker & Brackett PC

(57) ABSTRACT

Disclosed is a radar signal processing device 2 including frequency domain converters 201-1 to 201-M to convert raw data 11-1 to 11-M showing observation results acquired by a radar device 1 into those in a frequency domain, a signal restorer 202 to synthesize the raw data 11-1 to 11-M whose domain is converted into the frequency domain according to a least square method, a time domain converter 203 to return a signal series after synthesis to that in a time domain, and an image reproducer 204 to acquire a reproduced image 12 by performing image reproduction on the signal series whose domain is returned to the time domain.

10 Claims, 6 Drawing Sheets

(56) References Cited

OTHER PUBLICATIONS

An Office Action issued by the Canadian Intellectual Property Office dated Dec. 27, 2017, which corresponds to Canadian Patent Application 2,916,451 and is related to U.S. Appl. No. 14/906,302.
Gebert, N.; Digital Beamforming on Receive: Techniques and Optimization Strategies for High-Resolution Wide-Swath SAR Imaging; IEEE Transactions on Aerospace and Electronic Systems; vol. 45, Issue: 2; pp. 564-592; Apr. 30, 2009.
Nicolas Gebert et al., Digital Beamforming on Redeye: Techniques and Optimization Strategies for High-Resolution Wide-Swath SAR Imaging, IEEE Transactions on Aerospace and Electronics Systems, Apr. 2009, pp. 564-592, vol. 45, No. 2.
Ian G. Cumming et al., Digital Processing of Synthetic Aperture Radar Data: Algorithms and Implementation (Artech House Remote Sensing Library), Jan. 2005, pp. 226-229, pp. 284-287, pp. 324-327.
Gerhard Krieger et al., "Unambiguous SAR Signal Reconstruction from Nonuniform Displaced Phase Center Sampling", IEEE Geoscience and Remote Sensing Letters, Oct. 2004, pp. 260-264, vol. 1, No. 4.
Tong Wang et al., "Improving the Image Quality of Spaceborne Multiple-Aperture SAR Under Minimization of Sidelobe Clutter and Noise," IEEE Goescience and Remote Sensing Letters, Jul. 2006, pp. 297-301, vol. 3, No. 3.
Steven M. Kay, "Fundamentals of Statistical Signal Processing: Estimation Theory", Prentice Hall Processing Series, 1993, pp. 222-227, vol. 1.
Charles V. Jakowatz et al., Spotlight-Mode Synthetic Aperture Radar: A Signal Processing Approach, 1996, pp. 70-81.
Xiulian Luo et al., Modification of Multichannel Reconstruction Algorithm on the SAR With Linear Variation of PRI, IEEE Journal of Selected Topics in Applied Earth Observations and Remote Sensing, Jul. 2014, pp. 3050-3059, vol. 7, No. 7.
International Search Report of PCT/JP2014/078210 dated Dec. 2, 2014.

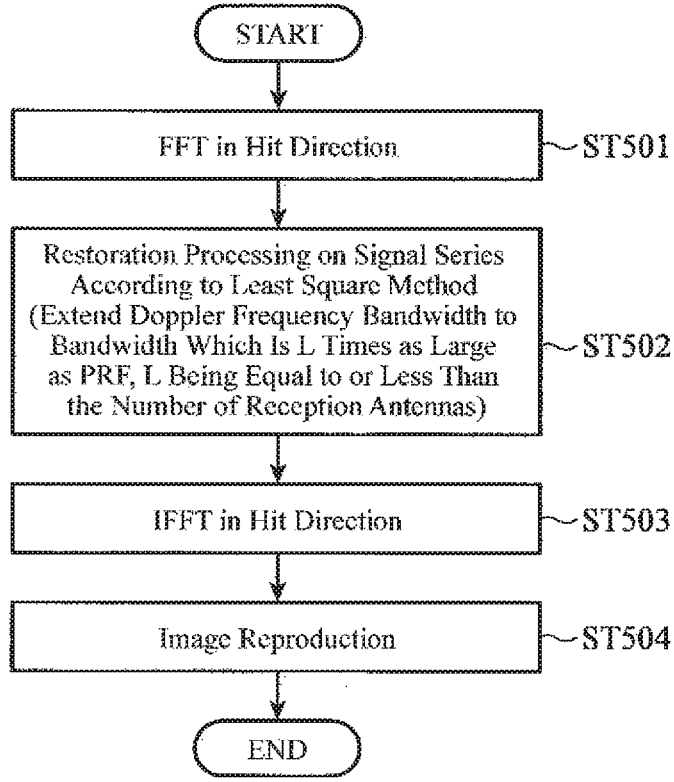
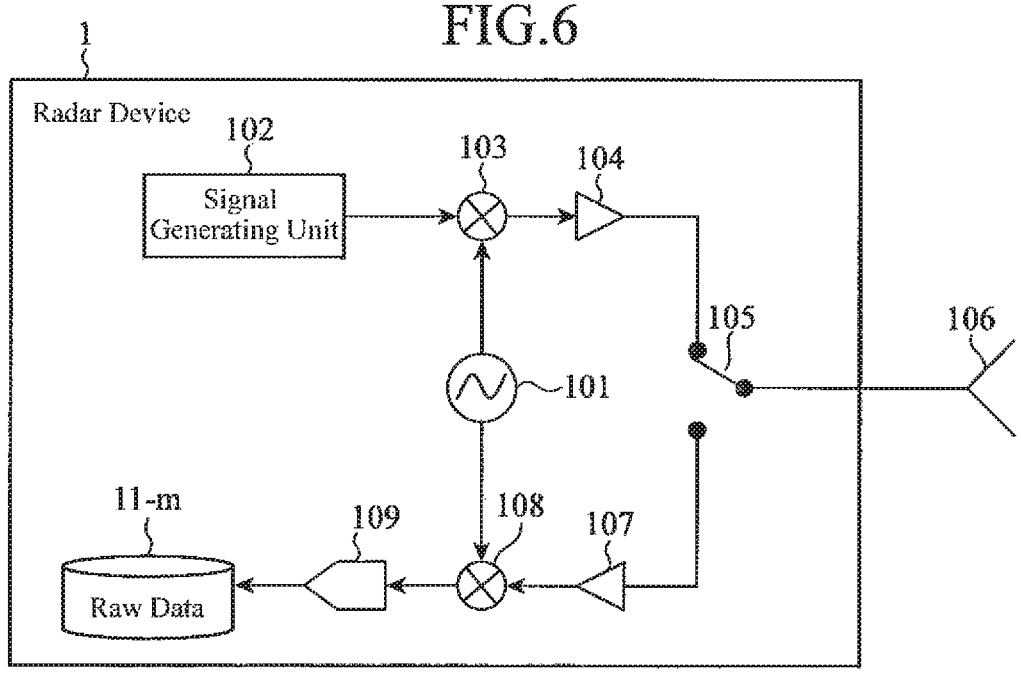

RADAR SYSTEM AND RADAR SIGNAL PROCESSING DEVICE

FIELD OF THE INVENTION

The present invention relates to a radar system provided with a radar device that observes a target at a set pulse repetition frequency, and a radar signal processing device that processes a plurality of signal series showing observation results acquired by the radar device, and the radar signal processing device.

BACKGROUND OF THE INVENTION

As a technique of implementing a wide observation width and a nigh resolution of a synthetic aperture radar (SAR), there is a multi-beam SAR in which a plurality of receivers are disposed in a radar device that observes a target. This multi-beam SAR can cope with both a wide observation width according to a plurality of signal series at a low pulse repetition frequency (PRE) and increase in the resolution in an azimuth direction according to sampling in a high direction. By using a restoration algorithm for this multi-beam SAR to extend the Doppler frequency bandwidth of each signal series, the conditions which are required for the design of the multi-beam SAR can be eased (for example, refer to nonpatent reference 1).

RELATED ART DOCUMENT

Nonpatent Reference

Nonpatent reference 1: G. Krieger, N. Gebert and A. Moreira, "Unambiguous SAR signal reconstruction from non-uniform displaced phase center sampling", IEEE Geoscience and Remote Sensing Letters, vol. 1, no. 4, pp. 260-264, October, 2004.

Nonpatent reference 2: Tong Wangand Zheng Bao, "Improving the image quality of spaceborne multiple-aperture SAR under minimization of sideiobe clutter and noise," IEEE Geoscience and Remote Sensing Letters, vol. 3, no. 3, pp. 297-301, 2006.

Nonpatent reference 3: M. K. Steven, "Fundamentals of Statistical Signal Processing: Estimation Theory", Prentice Hail PTR Prentice-Hall, Inc., 1993.

Nonpatent reference 4 Ian G. Cumming and Frank H. Wong, "digital processing of SYNTHETIC APERTURE RADAR DATA", ARTECH HOUSE Nonpatent reference 5: Charles V. Jakowatz Jr., Daniel E. Wahl, Palu H. Eichel, Dennis C. Ghiglia and Paul A. Thompson, "SPOTLIGHT-MODE SYNTHETIC APERTURE RADAR: A SIGNAL PROCESSING APPROACH", KLUWER ACADEMIC PUBLISHERS

SUMMARY OF THE INVENTION

Problems to be Solved by the Invention

A problem is, however, that in the conventional multi-beam SAR, when a restoration algorithm is simply used, noise enhancement occurs and a noise component included in the signal series is amplified.

To solve this problem, there has been proposed a restoration algorithm that can reduce the noise enhancement while the Doppler frequency bandwidth of a signal series, which is extended according to the restoration algorithm, becomes narrower than a bandwidth which is integer times as wide as PRE, the integer being the number of reception antennas which the receiver has (for example, refer to nonpatent reference 2) problem with the method disclosed by nonpatent reference 2 is, however, that the Doppler frequency bandwidth after extension is limited to a bandwidth which is odd number times as wide as PRF. Further, application of a regularized least square method is not described in the reference.

The present invention is made in order to solve the above-mentioned problems, and it is therefore an object of the present invention to provide a radar system and a radar signal processing device that can extend the Doppler frequency bandwidth of a signal series to a bandwidth which is arbitrary integer times as wide as PRF, the integer being equal to or smaller than either the number of reception antenna which a radar device has, or the number of signal series, and that can reduce the noise enhancement.

Means for Solving the Problem

In accordance with the present invention, there is provided a radar system provided with a radar device that observes a target at a set pulse repetition frequency, and a radar signal processing device that processes a plurality of signal series showing observation results acquired by the radar device, in which the radar signal processing device includes: a frequency domain converter to convert the plurality of signal series showing the observation results acquired by the radar device into those in a frequency domain; a signal restorer to synthesize the plurality of signal series whose domain is converted into the frequency domain by the frequency domain converter according to a least square method; a time domain converter to return a signal series after synthesis by the signal restorer to that in a time domain; and an image reproducer to acquire a reproduced image by performing image reproduction on the signal series whose domain is returned to the time domain by the time domain converter.

Advantages of the Invention

Because the radar system in accordance with the present invention is configured as above, the radar system can extend the Doppler frequency bandwidth of the signal series to a bandwidth which is arbitrary integer times as wide as PRE', the integer being equal to or smaller than either the number of reception antenna which the radar device has, or the number of signal series, and can reduce the noise enhancement.

BRIEF DESCRIPTION OF THE FIGURES

FIG. 5 is a flow chart showing a processing procedure of the radar signal processing device in accordance with Embodiment 1 of the present invention;

FIG. 6 is a diagram showing the configuration of a radar device in accordance with Embodiment 2 of the present invention;

EMBODIMENTS OF THE INVENTION

Hereafter, the preferred embodiments of the present invention will be explained in detail with reference to the drawings.

Embodiment 1

Figure 1:
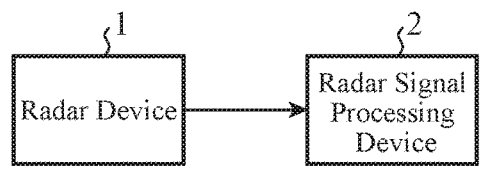
FIG. 1 is a diagram showing the configuration of a radar system in accordance with Embodiment 1 of the present invention.

In Embodiment 1, a radar system (SAR system) that reduces the noise enhancement at the time of restoration processing by reducing the Doppler frequency bandwidth of a signal series which is extended through the restoration processing to a bandwidth or less, this bandwidth being integer times as wide as PRF and the integer being the number of reception antennas, will be shown. FIG. 1 is a diagram showing the configuration of the radar system in accordance with Embodiment 1 of the present invention.

The radar system is configured with a radar device 1 and a radar signal processing device 2, as shown in FIG. 1.

Figure 2:
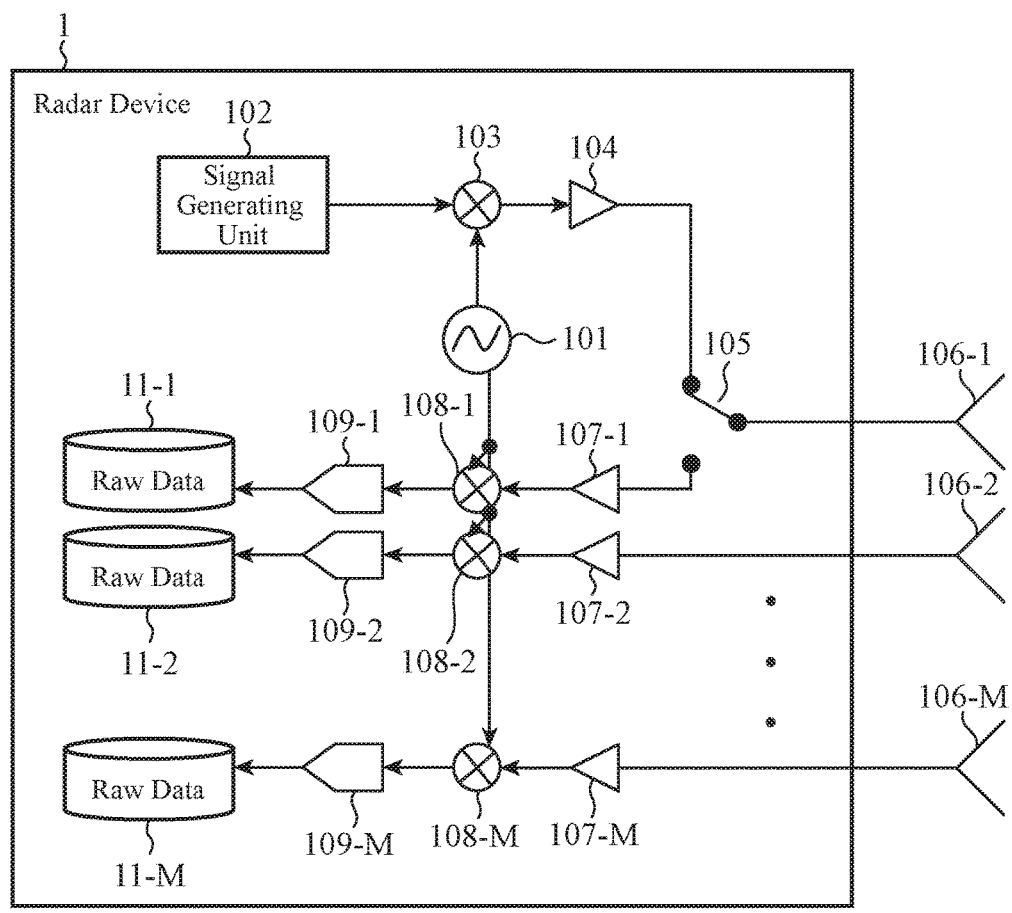
FIG. 2 is a diagram showing the configuration of a radar device in accordance with Embodiment 1 of the present invention.

The radar device 1 is mounted in a platform, and observes a target while moving at a fixed speed in order to implement a synthetic aperture. This radar device 1 is configured with a local oscillator 101, a signal generating unit 102, a multiplier 103, an amplifier 104, a selector 105, M antennas 106-1 to 106-M, M amplifiers 107-1 to 107-M, N multipliers 108-1 to 108-M, and M A/D converters 109-1 to 109-M, as shown in FIG. 2.

The local oscillator 101 outputs a local oscillation signal having a predetermined frequency. The signal generating unit 102 generates a signal (pulse) at a sec low pulse repetition frequency (PRF).

The multiplier 103 upconverts the signal generated by the signal generating unit 102 by using the local oscillation signal outputted from the local oscillator 101.

The amplifier 104 amplifies the signal upconverted the multiplier 103.

The selector 105 connects between the amplifier 104 and the antenna 106-1 or between the amplifier 107-1 and the antenna 106-1. This selector 105 outputs the signal amplified by the amplifier 104 to the antenna 106-1 by connecting between the amplifier 104 and the antenna 106-1, and also outputs a signal received by the antenna 106-1 to the amplifier 101-1 by connecting between the amplifier 107-1 and the antenna 106-1.

The antenna 106-1 sends out the signal outputted from the amplifier 104 via the selector 105 to outside the device (to a target), and also receives a signal (echo) from outside the device, this signal resulting from reflection of the above-mentioned signal. Each of the antennas 106-2 to 106-M receives a signal (echo) from outside the device, this signal resulting from reflection of the signal sent out by the antenna 106-1.

The amplifier 107-1 amplifies the signal which is received by the antenna 106-1 and outputted thereto via the selector 105. The amplifiers 107-2 to 107-M amplify the signals received by the antennas 106-2 to 106-M.

The multipliers 108-1 to 108-M downconvert the signals amplified by the amplifiers 107-1 to 107-M by using the local oscillation signal outputted from the local oscillator 101.

The A/D converters 109-1 to 109-M perform A/D conversion on the signals downconverted by the multipliers 108-1 to 108-M to digitize the signals.

The plurality of signal series at the low PRF which are digitized by these A/D converters 109-1 to 109-M are outputted to the radar signal processing device 2 as raw data 11-1 to 11-M.

Figure 3:
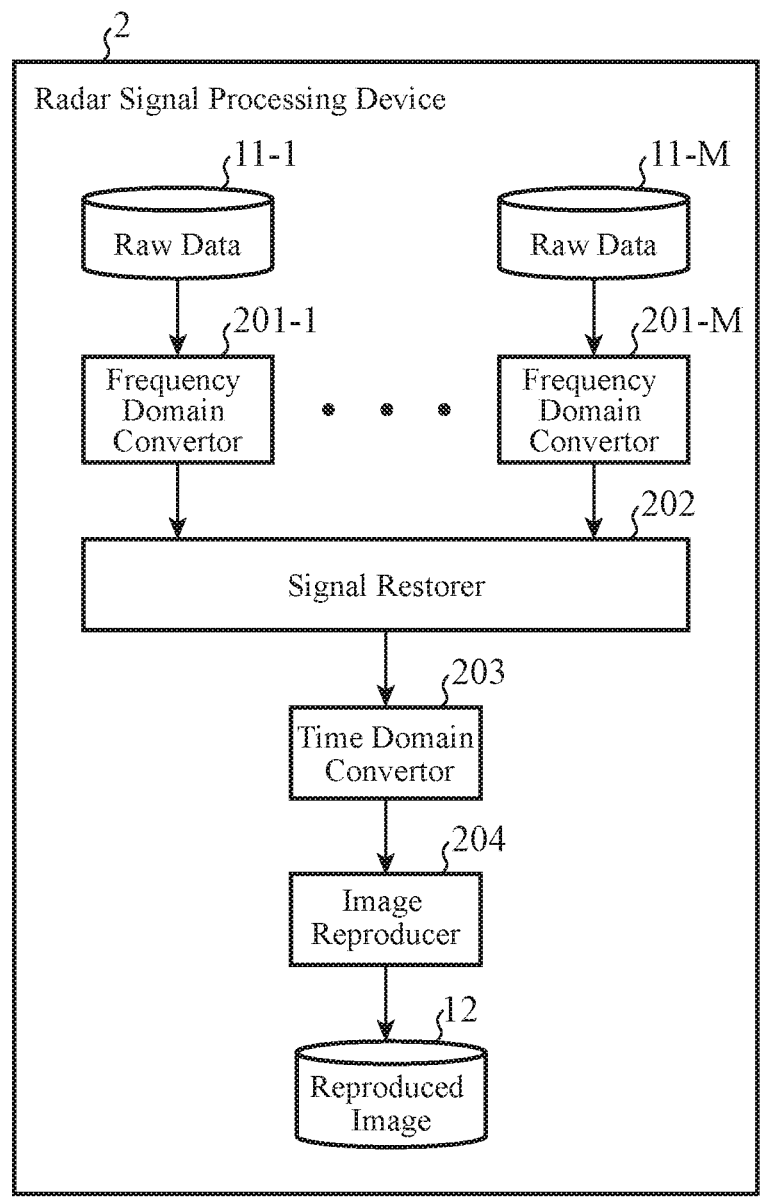
FIG. 3 is a diagram showing the configuration of a radar signal processing device at Embodiment 1 of the present invention.

The radar signal processing device 2 processes the raw data 11-1 to 11-M (the plurality of signal series showing observation results) which are acquired by the radar device 1. This radar signal processing device 2 is configured with M frequency domain converters 201-1 to 201-M, a signal restorer 202, a time domain converter 203, and an image reproducer 204, as shown in FIG. 3.

The frequency domain converters 201-1 to 201-M convert the raw data 11-1 to 11-M which are acquired by the radar device 1 into data in a Doppler frequency domain. At that time, the frequency domain converters 201-1 to 201-M can perform frequency domain conversion by using a Fourier transform (FFT: Fast Fourier Transform) in a hit direction. As an alternative, the frequency domain converters can use another method.

The signal restorer 202 synthesizes the raw data (signal series) 11-1 to 11-M whose domain is cored into the Doppler frequency domain by the frequency domain converters 201-1 to 201-M according to a restoration algorithm based on a least square method. At that time, the signal restorer 202 performs the synthesis in such a way as to extend the Doppler frequency bandwidth of a signal series after synthesis to a bandwidth which is arbitrary integer times as wide as PRF, the integer being equal to or smaller than the number of reception antennas.

The time domain converter 203 returns the signal series after synthesis by the signal restorer 202 to that in a time domain. At that time, the time domain converter 203 returns the signal series to that in the time domain by performing an inverse fast Fourier transform (IFFT) in a hit direction on the signal series.

The image reproducer 204 performs image reproduction on the signal series whose domain is returned to the time domain by the time domain converter 203, to acquire a reproduced image 12.

Next, a processing procedure of the radar system configured as above will be explained with reference to FIGS. 4 and 5. First, a processing procedure of the radar device 1 will be explained. It is assumed that the radar device 1 is moving at a fixed speed in order to implement a synthetic aperture.

Figure 4:
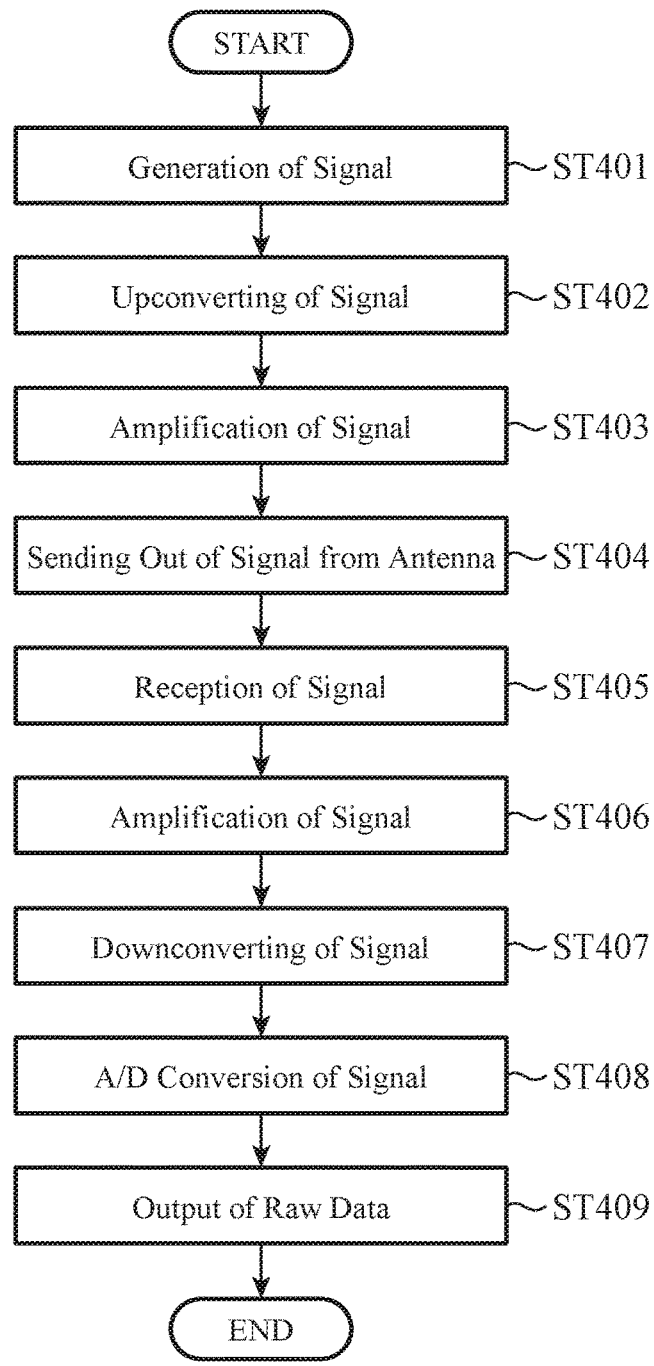
FIG. 4 is a flow chart showing a processing procedure of the radar device in accordance with Embodiment 1 of the present invention.

As shown in FIG. 4 in the transmitting operation of the radar device 1, the signal generating unit 102 generates a signal (pulse) at a low pulse repetition frequency (PRF) first (step ST401).

Then, the multiplier 103 upconverts the signal generated by the signal generating unit 102 by using the local oscillation signal outputted from the local oscillator 101 (step ST402).

The amplifier 104 then amplifies the signal upconverted by the multiplier 103 (step ST403).

The antenna 106-1 then sends out the signal which is amplified by the amplifier 104 and outputted thereto via the selector 105 to outside the device (a target) (step ST404).

Next, in the receiving operation of she radar device 1, each of the antennas 106-1 to 106-M receives a signal (echo) resulting from reflection of the signal sent out in step ST404 first (step ST405).

Then, the amplifier 107-1 amplifies the signal which is received by the antenna 106-1 and outputted thereto via the selector 105, and the amplifiers 107-2 to 107-14 amplify the signals received by the antennas 106-2 to 106-M (step ST406).

The multipliers 108-1 to 108-M then downconvert the signals amplified by the amplifiers 107-1 to 107-M bying the local oscillation signal outputted from she local oscillator 101 (step ST407).

Then, the A/D converters 109-1 to 109-M perform A/D conversion on the signals downconverted by the multipliers 108-1 to 108-M to digitize the signals (step ST408).

The A/D converters 109-1 to 109-M then output the plurality of signal series at the low PRF, which are digitized thereby, to the radar signal processing device 2 as raw data 11-1 to 11-M (step ST409).

Next, a processing procedure of the radar signal processing device 2 will be explained. Hereafter, an explanation will be made by assuming that the frequency domain converters 201-1 to 201-M perform FFT.

In the operation of the radar signal processing device 2, as shown in FIG. 5, the frequency domain converters 201-1 to 201-M convert the raw data 11-1 to 11-M acquired by the radar device 1 into those in the Doppler frequency domain by performing FFT in a hit direction first (step ST501).

The signal restorer 202 then synthesizes the raw data (signal series) 11-1 to 11-M whose domain is converted into the Doppler frequency domain by the frequency domain converters 201-1 to 201-M according to the restoration algorithm based on a least square method (step ST502). As a result, a spectrum of a broadband signal without aliasing is restored.

Hereafter, the restoration algorithm which the signal restorer 202 uses will be explained.

First, a case in which the Doppler frequency bandwidth of the signal series is extended to a bandwidth which is arbitrary odd number ($2I+1=L$) times as wide as PRF, the odd number being equal to or smaller than the number (M) of antennas 106-1 to 106-M, will be explained. In this case, $R(f)$ which is the raw data (signal series) 11-1 to 11-M (received signal components) whose domain is converted into the Doppler frequency domain by the frequency domain converters 201-1 to 201-M is provided as follows.

$$R(f)=[R_1(f) R_2(f) \ldots R_M(f)] \quad (1)$$

Further, when the gap between the antenna 106-1 to send out the pulse and the m-th antenna 106-*m* to receive an echo to the pulse is expressed by $\Delta Xn$, the pulse repetition frequency is expressed by PRF, the speed of the platform is expressed by V, the wavelength is expressed by $\lambda$, and the slant range distance is expressed by $R_2$, a transfer function $H(f)$ is defined as shown in the following equation (2).

$$H(f) = \begin{bmatrix} \exp\left(-j\pi\left[\frac{\pi\Delta x_1^2}{2\lambda R_0} + \frac{\Delta x_1}{v}\right](f-IPRF)\right) & \ldots & \exp\left(-j\pi\left[\frac{\pi\Delta x_M^2}{2\lambda R_0} + \frac{\Delta x_M}{v}\right](f-IPRF)\right) \\ \vdots & \ddots & \vdots \\ \exp\left(-j\pi\left[\frac{\pi\Delta x_1^2}{2\lambda R_0} + \frac{\Delta x_1}{v}\right](f+IPRF)\right) & \ldots & \exp\left(-j\pi\left[\frac{\pi\Delta x_M^2}{2\lambda R_0} + \frac{\Delta x_M}{v}\right](f+IPRF)\right) \end{bmatrix} \quad (2)$$

In accordance with the present invention, by then using the received signal components R (n and the transfer function $H(f)$, the spectrum $\hat{U}(f)$ of the broadband signal without aliasing is restored according to a least square method. (for example, nonpatent reference 3) by using the following equation (3).

$$\hat{U}(f)=R(f)H(f)^H(H(f)H(f)^H)^{-1} \quad (3)$$

$^{-1}$ is a symbol showing an inverse matrix, and $^H$ is a symbol showing a conjugate transposed matrix, The radar signal processing device is thus characterized in that the radar signal processing device can restore the broadband spectrum $\hat{U}(f)$ without aliasing which has the Doppler frequency bandwidth which is $2I+1=L$ (M>=L) times as wide as PRF from the M received signal components $R(f)$. Further, the radar signal processing device provides an advantage of being able to reduce the noise enhancement which is a problem with the conventional restoration algorithm.

Next, a case in which the Doppler frequency bandwidth of the signal series is extended to a bandwidth which is arbitrary even number ($2I=L$) times as wide as PRF, the even number being equal to or smaller than the number (M) of antennas 106-1 to 106-M, will be explained.

In this case, $\tilde{R}(f)$ which is the raw data 11-1 to 11-M (received signal components) whose domain is converted into the Doppler frequency domain by the frequency domain converters 201-1 to 201-M is provided as shown in the following equations (4) and (5).

$$\bar{R}(f)=[\bar{R}_1(f) \bar{R}_2(f) \ldots \bar{R}_M(f)] \quad (4)$$

$$\tilde{R}_m(f) = \begin{cases} R_m(f+PRF/2) & (-PRF/2 \le f < 0) \\ R_m(f-PRF/2) & (0 \le f < PRF/2) \end{cases} \quad (5)$$

Further, a transfer function $H(f)$ is defined as shown in the following equation (6).

$$H(f) = \begin{bmatrix} \exp\left(-j\pi\left[\frac{\pi\Delta x_1^2}{2\lambda R_0} + \frac{\Delta x_1}{v}(f-(I-1/2)PRF)\right]\right) & \ldots & \exp\left(-j\pi\left[\frac{\pi\Delta x_M^2}{2\lambda R_0} + \frac{\Delta x_M}{v}\right](f-(I-1/2)PRF)\right) \\ \vdots & \ddots & \vdots \\ \exp\left(-j\pi\left[\frac{\pi\Delta x_1^2}{2\lambda R_0} + \frac{\Delta x_1}{v}(f+(I-1/2)PRF)\right]\right) & \ldots & \exp\left(-j\pi\left[\frac{\pi\Delta x_M^2}{2\lambda R_0} + \frac{\Delta x_M}{v}\right](f+(I-1/2)PRF)\right) \end{bmatrix} \quad (6)$$

In accordance with the present invention, by then using the received signal components $\tilde{R}(f)$ and the transfer function $H(f)$, the spectrum $\hat{U}(f)$ of the broadband signal without aliasing is restored according to a least square method (for example, nonpatent reference 3) by using the following equations (7) and (8).

$$\hat{U}(f) = \tilde{R}(f)H(f)^H(H(f)H(f)^H)^{-1} \quad (7)$$

$$\hat{U}(f) = [\hat{U}(f-(1-\frac{1}{2})PRF)) \ldots \hat{U}(f+(1-\frac{1}{2})PRF))] \quad (8)$$

The radar signal processing device is thus characterized in that the radar signal processing device can restore the broadband spectrum: $\hat{U}(n$ without aliasing which has the Doppler frequency bandwidth which is $2I=L$ ($M>=L$) times as wide as PRF from the M received signal components $\tilde{R}(f)$. Further, the radar signal processing device provides an advantage of being able to reduce the noise enhancement which is a problem with the conventional restoration algorithm.

Returning to the explanation of the processing procedure of the radar signal processing device 2, the time domain converter 203 returns the signal series (the spectrum $\hat{U}(f)$ of the broadband signal) after synthesis by the signal restorer 202 to that in the time domain by performing IFFT in a hit direction (step ST503).

Then, the image reproducer 204 performs image reproduction on the signal series whose domain is returned to the time domain by the time domain converter 203, to acquire a reproduced image 12 (step ST504). In this case, as an image reproduction method which the image reproducer 204 uses, a polar format method, a chirp scaling method, a range-Doppler method, an ω-k method, which are disclosed in nonpatent references 4 and 5, etc. are provided.

As mentioned above, because the radar signal processing device in accordance with this Embodiment 1 is configured in such a way as to perform the restoration processing by using the restoration algorithm based on a least square method, the radar signal processing device can restore a signal series while reducing the noise enhancement. Further, after sorting the raw data (signal series) 11-1 to 1 whose domain is converted into the Doppler frequency domain by the frequency domain converters 201-1 to 201-MI by using the signal restorer 202, by repeatedly performing arrangement and then performing the synthesis according to the least square method, the radar signal processing device can perform, an extension, which has not been examined until now, of the Doppler frequency bandwidth to a bandwidth which is even number ($2I=L$) times as wide as PRF, the even number being equal to or smaller than the number of reception antennas, and hence can extend the Doppler frequency bandwidth of the signal series to a bandwidth which is arbitrary integer times as wide as PRF, the integer being equal to or smaller than the number of reception antennas.

Further, by using the following equation (9) based on a regularized least square method as a filter, the performance can be further improved.

$$\hat{U}(f) = \begin{cases} R(f)H(f)^H(H(f)H(f)^H + \alpha I)^{-1}(L = 2I+1) \\ \tilde{R}(f)H(f)^H(H(f)H(f)^H + \alpha I)^{-1}(L = 2I) \end{cases} \quad (9)$$

α can be provided on the basis of the noise power or the number of channels.

Further, assuming a case in which a part of data lacks as shown by, for example, $P(f)=[R_1(f) \ 0 \ R_3(f) \ R_4(f) \ R_5(f)]$, the restoration processing can be performed in that case while weights are changed as shown in the following equations (10) and (11).

$$\hat{U}(f) = P(f)G(f)^H(G(f)G(f)^H)^{-1} \quad (10)$$

$$G(f) = \begin{bmatrix} \exp\left(-j\pi\left[\frac{\pi\Delta x_1^2}{2\lambda R_0} + \frac{\Delta x_1}{v}\right](f-lPRF)\right) & 0 & \exp\left(-j\pi\left[\frac{\pi\Delta x_3^2}{2\lambda R_0} + \frac{\Delta x_3}{v}\right](f-lPRF)\right) & \ldots & \exp\left(-j\pi\left[\frac{\pi\Delta x_5^2}{2\lambda R_0} + \frac{\Delta x_5}{v}\right](f-lPRF)\right) \\ \exp\left(-j\pi\left[\frac{\pi\Delta x_1^2}{2\lambda R_0} + \frac{\Delta x_1}{v}\right](f)\right) & 0 & \exp\left(-j\pi\left[\frac{\pi\Delta x_3^2}{2\lambda R_0} + \frac{\Delta x_3}{v}\right](f)\right) & \ddots & \vdots \\ \exp\left(-j\pi\left[\frac{\pi\Delta x_1^2}{2\lambda R_0} + \frac{\Delta x_1}{v}\right](f+lPRF)\right) & 0 & \exp\left(-j\pi\left[\frac{\pi\Delta x_3^2}{2\lambda R_0} + \frac{\Delta x_3}{v}\right](f+lPRF)\right) & \ldots & \exp\left(-j\pi\left[\frac{\pi\Delta x_5^2}{2\lambda R_0} + \frac{\Delta x_5}{v}\right](f-lPRF)\right) \end{bmatrix} \quad (11)$$

Embodiment 2

In Embodiment 1, the case of providing the plurality of reception antennas 106-1 to 106-M in a platform, thereby acquiring plural pieces of raw data 11-1 to 11-M and restoring a signal series without aliasing is shown. In contrast with this, in Embodiment 2, a configuration will be shown in which by using a platform provided with a single reception antenna 106, an observation with the same observation geometry is performed on an identical target for observation multiple times, to acquire plural pieces of raw data (signal series) 11-1 to 11-M. A radar system (SAR system) that reduces the noise enhancement at the time of restoration processing by reducing the Doppler frequency bandwidth of a signal series which is extended, through the restoration processing, to a bandwidth or less, the bandwidth being integer times as wide as PRF and the integer being the acquired number of signal series, will be shown hereafter. FIG. 6 is a diagram showing the configuration of a radar device 1 in accordance with Embodiment 2 of the present invention.

The radar device 1 in accordance with Embodiment 2 shown in FIG. 6 is the one in which the plurality of receiving sets (the antennas 106-1 to 106-M, the amplifiers 107-1 to 107-M, the multipliers 108-1 to 108-M, and the A/D converter 109-1 to 109-M) of the radar device 1 in accordance with Embodiment 1 shown in FIG. 2 are changed to a single receiving set (an antenna 106, an amplifier 107, a multiplier 108, and an A/D converter 109). A signal restorer 202 performs synthesis in such a way as to extend the Doppler frequency bandwidth of a signal series after synthesis to a bandwidth which is arbitrary integer times as wide as PRF, the integer being equal to or smaller than the number of signal series. The other components are the same as those of Embodiment 1 and are designated by the same reference numerals, and the explanation of the components will be omitted hereafter.

Next, a processing procedure of the radar system configured as above will be explained with reference to FIGS. 7 and 8. First, a processing procedure of the radar device 1 will be explained. It is assumed that the radar device 1 is moving at a fixed speed in order to implement a synthetic aperture.

Figure 7:
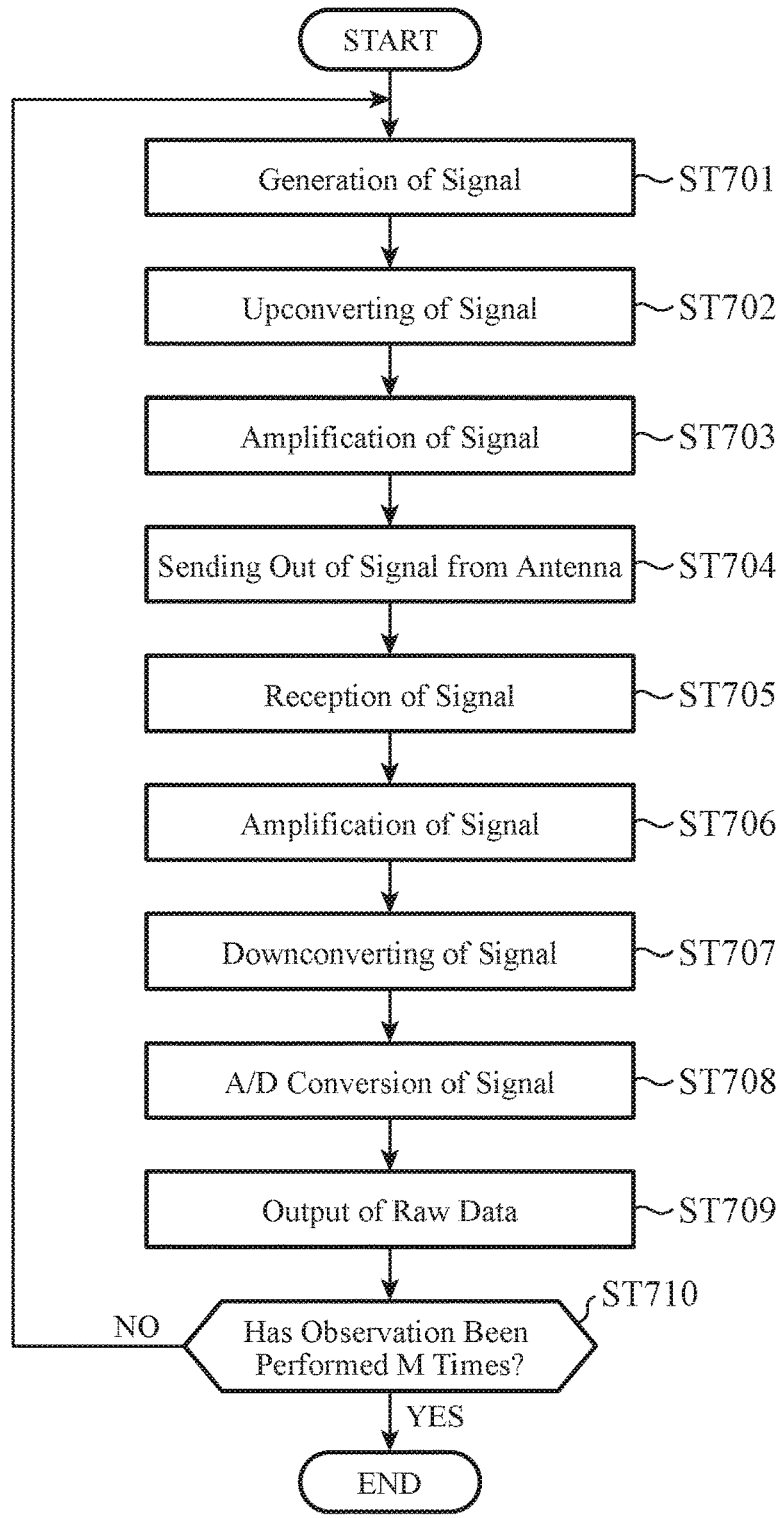
FIG. 7 is a flow chart showing a processing procedure of the radar device in accordance with Embodiment 2 of the present invention.

As shown in FIG. 7, in the transmitting operation of the radar device 1, a signal generating unit 102 generates a signal (pulse) at a low pulse repetition frequency (PRF) first (step ST701).

Then, a multiplier 103 upconverts the signal generated by the signal generating unit 102 by using a local oscillation signal outputted from a local oscillator 101 (step ST702).

An amplifier 104 then amplifies the signal upconverted by the multiplier 103 (step ST703).

Then, the antenna 106 sends out the signal which is amplified by the amplifier 104 and outputted thereto via a selector 105 to outside the device (a target) (step ST704).

Next, in the receiving operation of the radar device 1, the antenna 106 receives a signal (echo) resulting from reflection of the signal sent out in step ST704 first (step ST705).

Then, the amplifier 107 amplifies the signal which is received by the antenna 106 and outputted thereto via the selector 105 (step ST706).

The multiplier 108 then downconverts the signal amplified by the amplifier 107 by using the local oscillation signal outputted from the local oscillator 101 (step ST707).

Then, the A/D converter 109 performs A/D conversion on the signal downconverted by the multiplier 108 to digitize the signal (step ST708).

The A/D converter 109 then outputs the signal series at the low PRF, which is digitized thereby, to a radar signal processing device 2 as raw data 11-$m$ ($m$=1, 2, . . . , M) (step ST709).

Then, the radar device 1 determines whether or not it has performed an observation M times (step ST710). When it is determined in this step ST710 that the radar device has not performed an observation M times, the sequence returns to step ST701. By then repeating a series of observations (processes of steps ST701 to 709) on the identical object for observation M times with the same observation geometry, the radar device acquires plural pieces of raw data 11-1 to 11-M.

Next, a processing procedure of the radar signal processing device 2 will be explained. Hereafter, an explanation will be made by assuming that frequency domain converters 201-1 to 201-M perform FFT.

Figure 8:
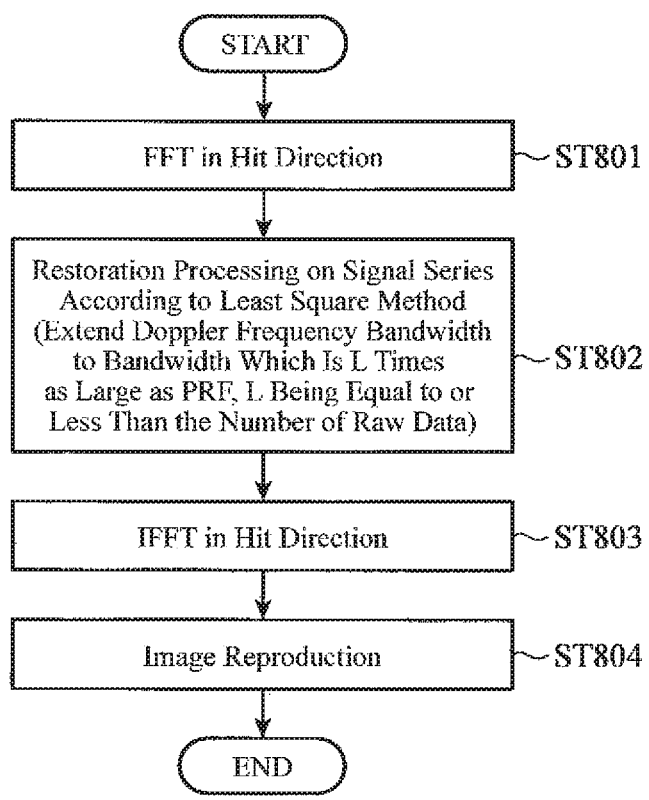
FIG. 8 is a flow chart showing a processing procedure of a radar signal processing device in accordance with Embodiment 2 of the present invention.

In the operation of the radar signal processing device 2, as shown in FIG. 8, the frequency domain converters 201-1 to 201-M convert the raw data 11-1 to 11-M acquired by the radar device 1 into those in a Doppler frequency domain by performing FFT in a hit direction first (step ST801).

Then, the signal restorer 202 synthesizes the raw data (signal series) 11-1 to 11-M whose domain is converted into the Doppler frequency domain by the frequency domain converters 201-1 to 201-M according to a restoration algorithm based on a least square method (step ST802). As a result, a spectrum of a broadband signal without aliasing is restored.

Hereafter, the restoration algorithm which the signal restorer 202 uses will be explained.

First, a case in which the Doppler frequency bandwidth of the signal series is extended to a bandwidth which is arbitrary odd number (2I+1=L) times as wide as PRF, the odd number being equal to or smaller than the number (M) of raw data 11-1 to 11-M will be explained.

In this case, R(f) which is the raw data (signal series) 11-1 to 11-M (received signal components) whose domain is converted into the Doppler frequency domain by the frequency domain converters 201-1 to 201-M is provided as shown in the following equation (12).

$$R(f)=[R_1(f)R_2(f) \ldots ,R_M(f)] \quad (12)$$

Further, when a time lag, with respect to a reference, of the observation timing at the time of the m-th observation is expressed by $T_m$, the pulse repetition frequency is expressed by PRF, the speed of the platform is expressed by v, the wavelength is expressed by λ and the slant range distance is expressed by $R_0$, a transfer function H(f) is defined as shown in the following equation (13).

$$H(f) = \begin{bmatrix} \exp(-j2\pi T_1(f - IPRF)) & \ldots & \exp(-j2\pi T_M(f - IPRF)) \\ \vdots & \ddots & \vdots \\ \exp(-j2\pi T_1(f + IPRF)) & \ldots & \exp(-j2\pi T_M(f + IPRF)) \end{bmatrix} \quad (13)$$

In accordance with the present invention, by then using the received signal components R(f) and the transfer function H(f), the spectrum Û(f) of the broadband signal without aliasing is restored according to a least square method (for example, nonpatent reference 3) by using the following equation (14).

$$Û(f)=R(f)H(f)^H(H(f)H(f)^H)^{-1} \quad (14)$$

$^{-1}$ is a symbol showing an inverse matrix, and $^H$ is a symbol showing a conjugate transposed matrix.

The radar signal processing device is thus characterized. In that the radar signal processing device can restore the broadband spectrum Û(f) without aliasing which has the Doppler frequency bandwidth which is 2I+1=L (M>=L) times as wide as PRF from the M received signal components RV). Further, the radar signal processing device provides an advantage of being able to reduce the noise enhancement which is a problem with the conventional restoration algorithm.

Next, a case in which the Doppler frequency bandwidth of the signal series is extended to a bandwidth which is arbitrary even number (2I=L) times as wide as PRF, the even number being equal to or smaller than the number (M) of raw data 11-1 to 11-M, will be explained. In this case, R̃(f) which is the raw data 11-1 to 11-M (received signal components) whose domain is converted into the Doppler frequency domain by the frequency domain converters 201-1 to 201-M is provided as shown in the following equations (15) and (16).

$$\tilde{R}(f)=[\tilde{R}_1(f)\tilde{R}_2(f) \ldots \tilde{R}_M(f)] \quad (15)$$

$$\tilde{R}_m(f) = \begin{cases} R_m(f + PRF/2) & (-PRF/2 \le f < 0) \\ R_m(f - PRF/2) & (0 \le f < PRF/2) \end{cases} \quad (16)$$

Further, a transfer function H(f) is defined as shown in the following equation (17).

$$H(f) = \begin{bmatrix} \exp\left(\dfrac{-j\pi 2T_1}{(f-(I-1/2)PRF)}\right) & \cdots & \exp\left(\dfrac{-j\pi 2T_M}{(f-(I-1/2)PRF)}\right) \\ \vdots & \ddots & \vdots \\ \exp\left(\dfrac{-j\pi 2T_1}{(f+(I-1/2)PRF)}\right) & \cdots & \exp\left(\dfrac{-j\pi 2T_M}{(f+(I-1/2)PRF)}\right) \end{bmatrix} \quad (17)$$

In accordance with the present invention, by then using the received signal components 110 and the transfer function H(f), the spectrum Û(f) of the broadband signal without aliasing is restored according to a least square method (for example, nonpatent reference 3) by using the following equations (18) and (19).

$$\hat{U}(f) = \tilde{R}(f)H(f)^H (H(f)H(f)^H)^{-1} \quad (18)$$

$$\hat{U}(f) = [\hat{U}(f-(I-\tfrac{1}{2})PRF)) \ldots \hat{U}(f+(I-\tfrac{1}{2})PRF)] \quad (19)$$

The radar signal processing device is thus characterized in that the radar signal processing device can restore the broadband spectrum (t) without aliasing which has the Doppler frequency bandwidth which is 2I=L (M>=L) times as wide as PRF from the M received signal components R̃(f). Further, the radar signal processing device provides an advantage of being able to reduce the noise enhancement which is a problem with the conventional restoration algorithm.

Returning to the explanation of the processing procedure of the radar signal processing device 2, a time domain converter 203 returns the signal series (the spectrum Û(f) of the broadband signal) after synthesis by the signal restorer 202 to that in a time domain by performing IFFT in a hit direction (step ST803).

Then, an image reproducer 204 performs image reproduction on the signal series whose domain is returned to the time domain by the time domain converter 203, to acquire a reproduced image 12 (step ST804). In this case, as an image reproduction method which the image reproducer 204 uses, a polar format method, a chirp scaling method, a range-Doppler method, an ω-k method, which are disclosed in nonpatent references 4 and 5, etc. are provided.

As mentioned above, because the radar signal processing device in accordance with this Embodiment 2 is configured in such a way as to perform the restoration processing by using the restoration algorithm based on a least square method, the radar signal processing device can restore a signal series while reducing the noise enhancement. Further, after sorting the raw data (signal series) 11-1 to 11-M whose domain is converted into the Doppler frequency domain by the frequency domain converters 201-1 to 201-M by using the signal restorer 202, by repeatedly performing arrangement and then performing the synthesis according to the least square method, the radar signal processing device can perform, an extension, which has not been examined until now, of the Doppler frequency bandwidth to a bandwidth which is even number (2I=L) times as wide as PRF, the even number being equal to or smaller than the number of raw data 11-1 to 11-M, and hence can extend the Doppler frequency bandwidth of the signal series to a bandwidth which is arbitrary integer times as wide as PRF, the integer being equal to or smaller than the number of raw data 11-1 to 11-M.

Further, by using the following equation (20) based on a regularized least square method as a filter, the performance can be further improved.

$$\hat{U}(f) = \begin{cases} R(f)H(f)^H (H(f)H(f)^H + \alpha I)^{-1} & (L = 2I+1) \\ \tilde{R}(f)H(f)^H (H(f)H(f)^H + \alpha I)^{-1} & (L = 2I) \end{cases} \quad (20)$$

α can be provided on the basis of the noise power or the number of channels.

Further, assuming a case in which a part of data backs as shown by, for example, P(f)=[R₁(f) 0 R₃(f) R₄(f) R₅(f)], the restoration processing can be performed in that case While weights are changed as shown in the following equations (21) and (22).

$$\hat{U}(f) = P(f)G(f)^H (G(f)G(f)^H)^{-1} \quad (21)$$

$$G(f) = \begin{bmatrix} \exp(-j2\pi T_1(f-IPRF)) & 0 & \exp(-j2\pi T_3(f-IPRF)) & \cdots & \exp(-j2\pi T_5(f-IPRF)) \\ \exp(-j2\pi T_1(f)) & 0 & \exp(-j2\pi T_3(f)) & & \vdots \\ \exp(-j2\pi T_1(f+IPRF)) & 0 & \exp(-j2\pi T_3(f+IPRF)) & \cdots & \exp(-j2\pi T_5(f-IPRF)) \end{bmatrix} \quad (22)$$

While the invention has been described in its preferred embodiments, it is to be understood that an arbitrary combination of two or more of the above mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the radar system in accordance with the present invention can extend the Doppler frequency bandwidth of a signal series to a bandwidth which is arbitrary integer times as wide as PRF, the integer being equal to or smaller than either the number of reception antenna which the radar device has, or the number of signal series, and can reduce the noise enhancement, the radar system is suitable for use as a radar system provided with a radar device that observes a target at a set pulse repetition frequency, and a radar signal processing device that processes a plurality of signal series showing observation results acquired by the radar device, and so on.

EXPLANATIONS OF REFERENCE NUMERALS 1 radar device, 2 radar signal processing device, 11-1 to 11-M raw data, 12 reproduced image, 101 local oscillator, 102 signal generating unit, 103 multiplier, 104 amplifier, 105 selector, 106, 106-1 to 106-M antenna, 107, 107-1 to 107-M amplifier, 108, 108-1 to 108-M multiplier, 109, 109-1 to 109-M A/D converter, 201-1 to 201-M frequency domain converter, 202 signal restorer, 203 time domain converter, and 204 image reproducer.

The invention claimed is:

1. A radar system provided with a radar device that includes a plurality of reception antennas and observes a target at a set pulse repetition frequency using the plurality of reception antennas, and with a radar signal processing device that processes a plurality of signal series showing a plurality of observation results acquired by said radar device, wherein
said radar signal processing device comprises:
a frequency domain converter to convert the plurality of signal series into a plurality of received signal components in a frequency domain, respectively;
a signal restorer to synthesize the received signal components in such a way as to generate a broadband signal having a frequency bandwidth which is L times the pulse repetition frequency where L is a positive integer equal to or smaller than either a number of the reception antennas or a number of the signal series, according to an algorithm based on a least square method;
a time domain converter to convert an output signal series of said signal restorer into a signal series in a time domain; and
an image reproducer to acquire a reproduced image by performing image reproduction on the signal series in the time domain.

2. The radar system according to claim 1, wherein after sorting M received signal components, said signal restorer repeatedly performs arrangement and synthesizes the M received signal components according to the algorithm based on the least square method.

3. The radar system according to claim 1, wherein said signal restorer uses a regularized least square method as said least square method.

4. The radar system according to claim 3, wherein noise power is reflected in said regularized least square method.

5. The radar system according to claim 3, wherein after sorting M received signal components, said signal restorer repeatedly performs arrangement and synthesizes the M received signal components according to the algorithm based on the least square method.

6. The radar system according to claim 1, wherein the algorithm based on the least square method is executed using the plurality of received signal components, a transfer function matrix, and a conjugate transposed matrix for the transfer function matrix.

7. The radar system according to claim 6, wherein each component of the transfer function matrix includes a gap between the reception antennas, a velocity of a platform on which the radar system is positioned, and a slant range to a target.

8. A radar signal processing device that processes a plurality of signal series showing a plurality of observation results acquired by a radar device that includes a plurality of reception antennas and observes a target at a set pulse repetition frequency using the plurality of reception antennas, said radar signal processing device comprising:
a frequency domain converter to convert the plurality of signal series into a plurality of received signal components in a frequency domain, respectively;
a signal restorer to synthesize the received signal components in such a way as to generate a broadband signal having a frequency bandwidth which is L times the pulse repetition frequency where L is a positive integer equal to or smaller than either a number of the reception antennas or a number of the signal series, according to an algorithm based on a least square method;
a time domain converter to convert an output signal series of said signal restorer into a signal series in a time domain; and
an image reproducer to acquire a reproduced image by performing image reproduction on the signal series in the time domain.

9. The radar system according to claim 8, wherein the algorithm based on the least square method is executed using the plurality of received signal components, a transfer function matrix, and a conjugate transposed matrix for the transfer function matrix.

10. The radar system according to claim 9, wherein each component of the transfer function matrix includes a gap between the reception antennas, a velocity of a platform on which the radar system is positioned, and a slant range to a target.

* * * * *